US 6,605,882 B2

(12) United States Patent
Boudrias et al.

(10) Patent No.: US 6,605,882 B2
(45) Date of Patent: Aug. 12, 2003

(54) INTEGRATED HARMONIC MITIGATION DEVICE AND DISTRIBUTION PANEL CONFIGURED AS A POWER CENTER UNIT FOR ELECTRONIC EQUIPMENT

(75) Inventors: Jean-Guy Boudrias, Laval (CA); Stéphane Brouillette, Granby (CA)

(73) Assignee: Delta Transformers of Canada (1999) Ltd. (CA)

( * ) Notice: Subject to any disclaimer, the term of this patent is extended or adjusted under 35 U.S.C. 154(b) by 0 days.

(21) Appl. No.: 10/039,700

(22) Filed: Oct. 19, 2001

(65) Prior Publication Data

US 2002/0105816 A1 Aug. 8, 2002

Related U.S. Application Data

(60) Provisional application No. 60/241,763, filed on Oct. 20, 2000.

(51) Int. Cl.[7] .................................................. H02J 1/00
(52) U.S. Cl. ........................................................ 307/105
(58) Field of Search ..................... 363/39, 40; 323/205, 323/207; 307/105

(56) References Cited

U.S. PATENT DOCUMENTS 5,448,443 A    9/1995   Muelleman
5,576,942 A   11/1996   Beverly et al.
6,043,569 A    3/2000   Ferguson
6,127,743 A * 10/2000   Levin et al. ................. 307/105

OTHER PUBLICATIONS

*Harmonic Current Reduction Techniques for Computer System*, Liebert Corporation, 2000 (downloaded from Liebert website on Oct. 18, 2001), 7 pages.

*MGE Dual Zig–Zag Harmonic Reduction Transformers*, MGE Technical Bulletin 1–11 (downloaded from MGEUPS website on Oct. 18, 2001), 3 pages.

* cited by examiner

*Primary Examiner*—Adolf D. Berhane
(74) *Attorney, Agent, or Firm*—Olson & Hierl, Ltd.

(57) ABSTRACT

An integral harmonic mitigation device and distribution panel(s) are configured as a power center unit for non-linear electrical loads. The power center unit performs harmonic mitigation to reduce the presence of upstream electrical disturbances in a source current. The power center unit is located close to the non-linear loads to isolate the loads and facilitate load balancing to improve harmonic mitigation. The power center unit is also ideally suited for mobile or semi-mobile applications.

23 Claims, 3 Drawing Sheets ively unknown, or subject to change without notice. Since proper load balancing in such installations is substantially impossible or a matter of chance, the efficacy of these installations is degraded and power factors suffer.
INTEGRATED HARMONIC MITIGATION DEVICE AND DISTRIBUTION PANEL CONFIGURED AS A POWER CENTER UNIT FOR ELECTRONIC EQUIPMENT

CROSS-REFERENCE TO RELATED APPLICATIONS

This application claims the benefit of U.S. provisional application Ser. No. 60/241,763 filed on Oct. 20, 2000.

TECHNICAL FIELD

This invention relates generally to electrical power distribution and more specifically to a power center unit for distributing electrical power to electronic equipment.

BACKGROUND OF THE INVENTION

A common problem in modern power distribution networks is AC (alternating current) line current having high harmonic content and hence the potential for overloaded neutral wires caused by the non-linear loading of electronic power supplies. Different solutions have been offered to overcome this problem. Some examples include: delta-wye transformers for canceling triplen harmonics ($3^{rd}$, $9^{th}$, $15^{th}$ . . . ); zig-zag transformers for diverting triplen harmonics from neutral conductors to phase conductors; dual-output transformers for canceling $3^{rd}$, $5^{th}$, $7^{th}$, $9^{th}$, $15^{th}$, $17^{th}$, $19^{th}$ . . . harmonics; and quad-output transformers for canceling $3^{rd}$, $5^{th}$, $7^{th}$, $9^{th}$, $11^{th}$, $13^{th}$, $15^{th}$, $17^{th}$, $19^{th}$, $21^{st}$ harmonics.

Each of the solutions noted above have a limitation that loads on each of the output phases of the transformer must be balanced to achieve the desired affect. Load balancing is very difficult in conventional power center installations. Conventional power center installations are designed to service very diverse, fluctuating loads, such as entire office buildings. The pieces of electronic equipment served by a single power center are distributed over several floors of the building and are generally unknown, or subject to change without notice. Since proper load balancing in such installations is substantially impossible or a matter of chance, the efficacy of these installations is degraded and power factors suffer.

There is therefore a need in the industry for a power center unit that facilitates the segregation and balancing of loads across each of the output phases of the transformer in an electrical distribution system.

SUMMARY OF THE INVENTION

It is therefore an object of the present invention to provide a power center unit for electronic equipment that is constructed to facilitate the segregation and balancing of loads across each of the output phases of a transformer in an electrical distribution system to mitigate harmonic currents generated by those loads.

It is a further object of the invention to provide a power center unit that may be used as a turnkey mobile power unit for construction sites, film shoots, roadside signs and other mobile or semi-mobile applications.

Accordingly, there is provided a power center unit for electronic equipment comprising: a harmonic mitigation device for connection to a source of alternating current, the harmonic mitigation device mitigating certain harmonic currents to reduce harmonic currents drawn from the source of alternating current; and at least one distribution panel connected to the harmonic mitigation device, the harmonic mitigation device and the at least one distribution panel forming an integral unit.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION OF THE PREFERRED EMBODIMENT

Figure 1:
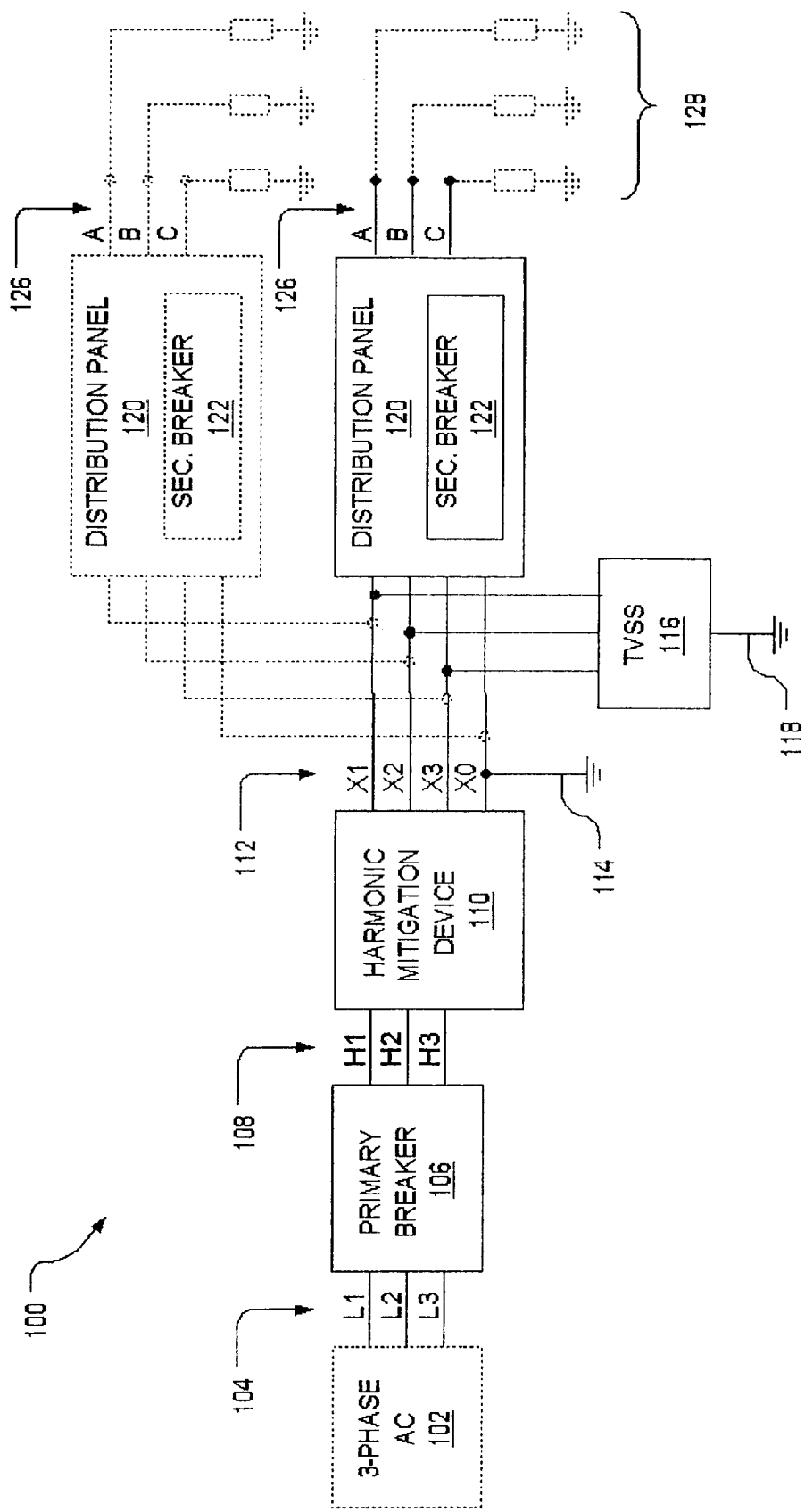
FIG. 1 is a block diagram of a power center unit of the present invention.

FIG. 1 is a block diagram of a power center unit 100 of a preferred embodiment of the present invention. The power center unit 100 includes an AC (alternating current) power bus 104 for connection to an external 3-phase AC power source 102 (shown in dotted outline) and connected to a primary breaker 106. The individual conductors of the AC power bus 104 are designated L1, L2, and L3. The primary breaker 106 is connected to a primary of a harmonic mitigation device 110 via a primary side bus 108.

The harmonic mitigation device 110 is any transformer, filter or other electrical or electronic device that is adapted to cancel or mitigate at least certain of the harmonic currents and/or voltages of power delivered from a three-phase alternating current source to a single-phase non-linear load. The harmonic mitigation device 110 may be, for example, a phase-shifting autotransformer that mitigates certain current and voltage harmonics by phase-shifting the load with respect to the primary bus; a zig-zag transformer that is delta-wye, wye-z, or delta-delta wired to mitigate certain current and voltage harmonics by isolating certain harmonic currents on a secondary side of the harmonic mitigation device 110 and contributing to phase shifting of other harmonic currents on a primary side bus; an active filter device, a series impedance device, or a tuned filter device that mitigates certain harmonic currents by reducing harmonic currents fed back to the source of alternating current; or any other power treatment device that mitigates harmonic currents by reducing, cancelling or otherwise removing harmonic currents delivered from the current source and/or generated by non-linear loads connected to the power center unit 100.

The individual conductors of the primary side bus 108 are designated H1, H2, and H3. A secondary of the harmonic mitigation device 110 is connected to at least one distribution panel 120 and an optional TVSS (transient voltage surge suppressor) 116 via a secondary side bus 112. The individual conductors of the secondary side bus 112 are designated X0, X1, X2, and X3. The X0 conductor of the secondary side bus 112 is connected to a ground reference 114. The optional TVSS 116 is also connected to a ground reference 118. The distribution panel(s) 120 has a secondary breaker(s) 122. The distribution panel(s) 120 provides a plurality of AC circuits for each of three phases 126 (only one load shown per circuit and only one circuit shown per phase) that provide power to a plurality of external loads 128 (shown in dotted outline). The three phases are designated A, B, and C.

Figure 2:
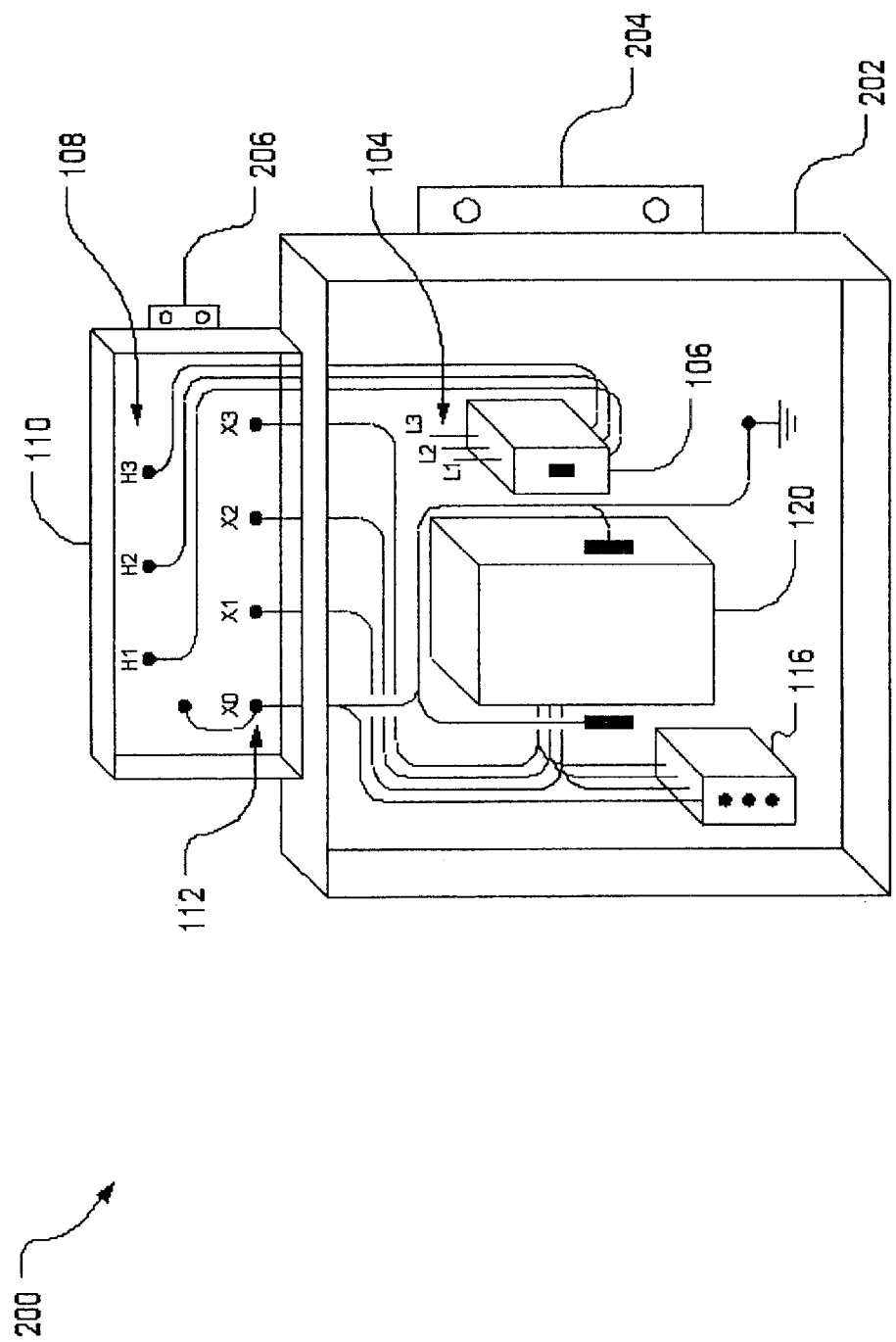
FIG. 2 is schematic diagram of the power center unit shown in FIG. 1.

FIG. 2 is a schematic diagram of a power center unit 200 in accordance with an embodiment of the invention. The primary breaker 106, optional TVSS 116 and distribution panel(s) 120 are mounted in a cabinet 202. The harmonic mitigation device 110 is affixed to a top of the cabinet 202, forming a single integral power center unit 200. The harmonic mitigation device 110 is preferably removably affixed to the top of the cabinet 202, to permit the harmonic mitigation device 110 to be changed, upgraded, or retrofitted. Mounting brackets 204,206 are provided on the power center unit 200 to facilitate mounting the power center unit 200 to a vertical surface, such as a wall of a power distribution room, a support surface in a mobile platform, a truck, a trailer, or the like.

Figure 3:
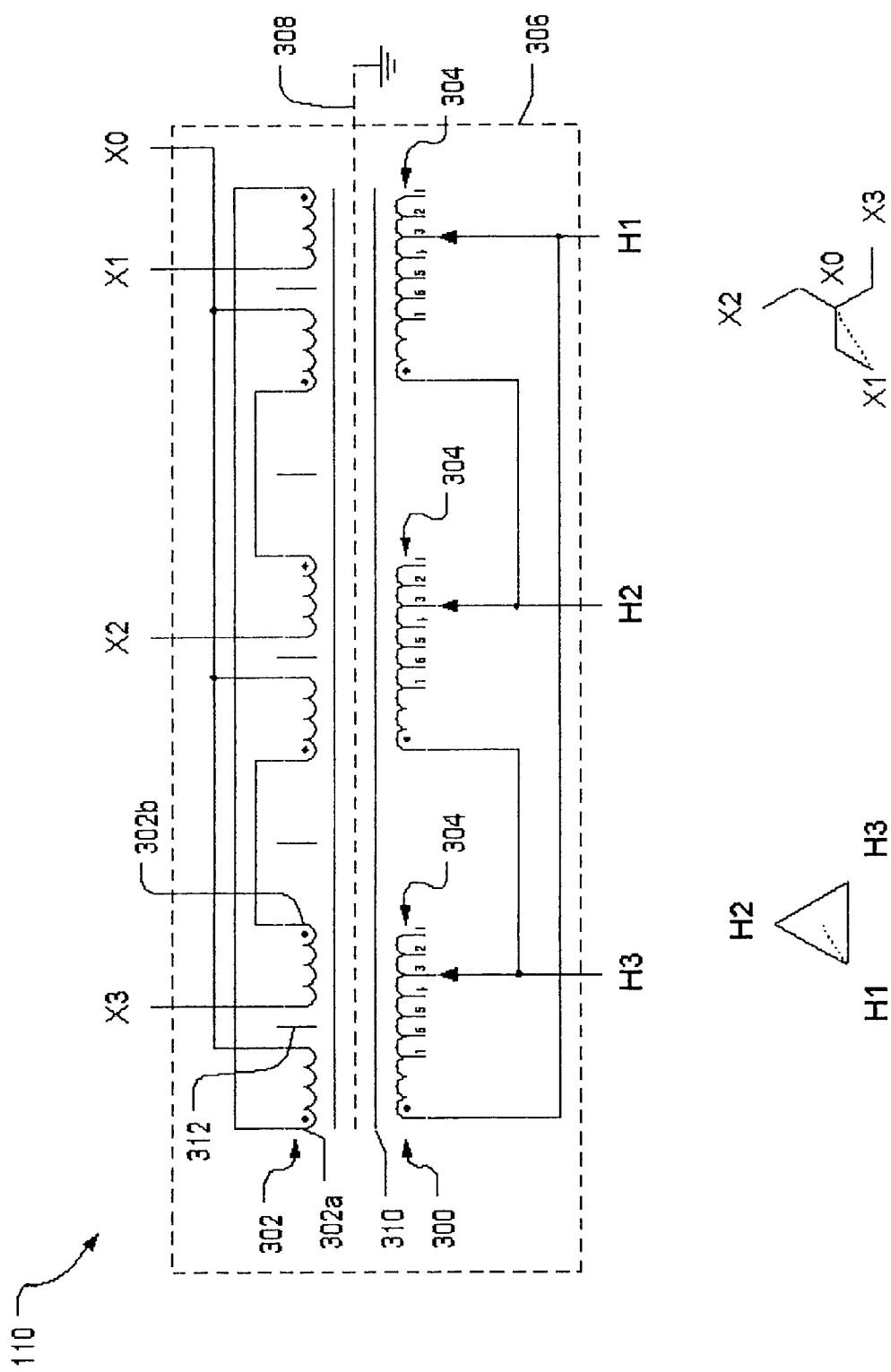
FIG. 3 is a schematic diagram of an embodiment of a harmonic mitigation device for the power center unit shown in FIG. 2.

FIG. 3 is a schematic diagram of one embodiment of the harmonic mitigation device 110. The harmonic mitigation device 110 shown in FIG. 3 is a delta-wye zig-zag transformer adapted to cancel balanced triplen harmonic ($3^{rd}$, $9^{th}$, $15^{th}$, . . . harmonic) currents and reduce distortion at the plurality of loads 128 (FIG. 2). The harmonic mitigation device 110 is also constructed so that the secondary winding 302 has a 30° phase shift (lagging) with respect the primary winding 300, to cancel the $5^{th}$ and $7^{th}$ harmonics and restrict the circulation of zero sequence harmonic currents to the secondary winding of the transformer 110, due solely to secondary winding electromagnetic effect without the use of electronic components.

The harmonic mitigation device 110 shown in FIG. 3 is, for example, a 15KVA, 3-phase, 3-coil zig-zag transformer with a common core construction. The primary winding 300 is 600 volts, delta connected, complete with four full capacity 2.5% adjustment taps 304, 2 below FCBN (full capacity below normal) and 2 above FCAN (full capacity above normal) the rated voltage. The secondary winding 302 is 208/120 volts, grounded-wye connection, single output and interconnected to obtain a 30° angular displacement (lagging) with respect to the primary winding.

The harmonic mitigation device 110 is preferably potted in a synthetic resin 306 for noise reduction, physical size reduction and wet condition operation. The harmonic mitigation device 110 preferably also has electrostatic shielding 308 located between the primary and secondary windings for common mode noise attenuation of 60 dB minimum for 60 Hz and 300 Hz. The secondary windings 302 are multiple conductors 302a, 302b for each phase connected in parallel and individually insulated by insulators 312 to minimize eddy current losses. The windings are wound with the secondary winding 302 nearest to the core 310 and the coils are preferably oval-shaped. The cores 310 of the transformer 110 are preferably constructed of grain-oriented silicon steel laminations. The positive and negative sequence impedance, at 60 Hz, is optimized to reduce THD (total harmonic distortion) of voltage due to harmonic content of load current to less than 2.0%.

The invention therefore provides a power center unit 200 that facilitates the segregation and balancing of loads across all output phases of a 3-phase harmonic mitigation device 110. For example, in an office building where diverse electronic equipment may be distributed over many floors, a power center unit 200 in accordance with the invention serves at most one of the floors, thereby facilitating the segregation and balancing of the loads on each of the output phases of the harmonic mitigation device 110 of each power center unit 200. The design and configuration of the harmonic mitigation device 110 is selected to satisfy the requirements of an installation, and may be influenced by the configuration of neighboring power center units 200, as will be understood by those skilled in the art of power treatment. Since harmonic mitigation is shifted into close proximity of the load, total harmonic distortion is reduced, power factor is improved, and electrical energy is conserved.

The power center unit 200 is also ideally suited for mobile applications. The power center unit 200 is readily mounted to a mobile platform, a truck, a trailer, or the like. This permits the power center unit 200 to be used as a power center unit for construction sites, film shoots, roadside signs, and other mobile or semi-mobile applications that require substantial amounts of quality electrical power.

The embodiment(s) of the invention described above is (are) intended to be exemplary only. The scope of the invention is therefore intended to be limited solely by the scope of the appended claims.

We claim:

1. A power center unit for electronic equipment, comprising in combination:
   a harmonic mitigation device connectable to a source of alternating current, the harmonic mitigation device mitigating certain harmonic currents, thus reducing harmonic currents drawn from the source of alternating current; and
   at least one distribution panel connected to the harmonic mitigation device, the harmonic mitigation device and the at least one distribution panel forming an integral unit.

2. A power center unit as claimed in claim 1 wherein the harmonic mitigation device is a transformer.

3. A power center unit as claimed in claim 1 wherein the harmonic mitigation device is a phase-shifting autotransformer that reduces harmonic currents fed back to the source of alternating currents.

4. A power center unit as claimed in claim 1 wherein the harmonic mitigation device is an active filter that reduces harmonic currents fed back to the source of alternating currents.

5. A power center unit as claimed in claim 1 wherein the harmonic mitigation device is a series impedance device that reduces harmonic currents fed back to the source of alternating currents.

6. A power center unit as claimed in claim 1 wherein the harmonic mitigation device is a tuned filter device that reduces harmonic currents fed back to the source of alternating currents.

7. A power center unit as claimed in claim 2 wherein the transformer reduces the 3rd, 5th, 7th, 9th, 15, 17th, and 19th harmonics on the secondary side bus due solely to secondary winding electromagnetic effect without the use of electronic components.

8. A power center unit as claimed in claim 2 wherein the transformer reduces $5^{th}$ and $7^{th}$ harmonics on the primary side by 30 degree phase shifting with other loads, and restricts the circulation of zero sequence harmonic currents to a secondary winding of the transformer.

9. A power center unit as claimed in claim 2 wherein the transformer is potted for noise reduction, physical size reduction and wet condition operation.

10. A power center unit as claimed in claim 1 further comprising surge protection circuitry associated with the harmonic mitigation device.

11. A power center unit as claimed in claim 1 wherein the harmonic mitigation device reduces the third harmonic voltage distortion at a load.

12. A power center unit as claimed in claim 11 wherein the third harmonic currents are reduced on a primary winding of the transformer and the primary side bus of the transformer due solely to secondary winding electromagnetic effect without the use of electronic components.

13. A power center unit as claimed in claim 12 wherein positive and negative sequence impedance at 60 Hz is optimized to reduce total harmonic distortion of voltage due to harmonic content of load current.

14. A power center unit as claimed in claim 13 further comprising electrostatic shields located between the primary and secondary winding for common mode noise attenuation.

15. A power center unit as claimed in claim 14 wherein multiple conductors are used for each phase in the secondary windings, the multiple conductors being connected in parallel and individually insulated to minimize eddy current losses.

16. A power center unit as claimed in claim 15 wherein the windings are wound with the secondary winding nearest to the core.

17. A power center unit as claimed in claim 16 wherein cores are constructed of grain-oriented silicon steel laminations.

18. A power center unit for reducing non-linear load generated harmonic currents and voltages on a three-phase, four-wire distribution source, comprising:

a harmonic mitigation device;

a power distribution cabinet supporting the harmonic mitigation device, the power distribution cabinet including at least one circuit breaker panel for connecting primary side terminals of the transformer to a four-wire three-phase power source; and a multiple branch circuit panel for connecting the secondary side terminals of the harmonic mitigation device to the non-linear loads.

19. A power center unit as claimed in claim 18 wherein the harmonic mitigation device is a three-phase phase-shifting transformer.

20. A power center unit as claimed in claim 18 wherein the harmonic mitigation device is an electronic active filter.

21. A power center unit as claimed in claim 18 wherein the harmonic mitigation device is a zero-sequence filter.

22. A power center unit as claimed in claim 18 wherein the harmonic mitigation device is a series impedance device.

23. A power center unit as claimed in claim 18 wherein the harmonic mitigation device is a tuned filter.

* * * * *

UNITED STATES PATENT AND TRADEMARK OFFICE
CERTIFICATE OF CORRECTION

PATENT NO.   : 6,605,882 B2  Page 1 of 1
DATED        : August 12, 2003
INVENTOR(S)  : Jean-Guy Boudrias et al.

It is certified that error appears in the above-identified patent and that said Letters Patent is hereby corrected as shown below:

Column 1,
Line 27, after "21$^{St}$" insert -- ... --.

Signed and Sealed this

Twenty-third Day of December, 2003

JAMES E. ROGAN
*Director of the United States Patent and Trademark Office*